US008477133B2

(12) United States Patent
Kim et al.

(10) Patent No.: US 8,477,133 B2
(45) Date of Patent: Jul. 2, 2013

(54) METHOD AND APPARATUS FOR GENERATING THREE-DIMENSIONAL FINITE ELEMENT MESH

(75) Inventors: Choong-Sik Kim, Suwon-si (KR); Seong-Woon Booh, Yongin-si (KR); Dong-Woo Lee, Seoul (KR); Jin-Woo Cho, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 1247 days.

(21) Appl. No.: 10/990,576

(22) Filed: Nov. 17, 2004

(65) Prior Publication Data
US 2005/0128198 A1    Jun. 16, 2005

(30) Foreign Application Priority Data
Nov. 17, 2003   (KR) .................. 10-2003-0081037

(51) Int. Cl.
G06T 17/00 (2006.01)
G06T 15/00 (2011.01)
G06F 19/00 (2011.01)
G06F 17/10 (2006.01)
G06F 17/50 (2006.01)

(52) U.S. Cl.
USPC ........... 345/420; 345/419; 345/423; 345/424; 700/182; 703/1; 703/2

(58) Field of Classification Search
None
See application file for complete search history.

(56) References Cited

U.S. PATENT DOCUMENTS

| | | | | |
|---|---|---|---|---|
| 5,345,391 A | * | 9/1994 | Hull et al. ............... | 700/182 |
| 5,553,206 A | * | 9/1996 | Meshkat ............... | 345/423 |
| 5,731,817 A | * | 3/1998 | Hahs et al. ............... | 345/423 |
| 5,768,156 A | | 6/1998 | Tautges et al. | |
| 6,573,892 B1 | | 6/2003 | Yang et al. | |
| 6,578,189 B2 | * | 6/2003 | Hariya et al. ............... | 716/20 |
| 6,781,582 B1 | * | 8/2004 | Van Rens ............... | 345/420 |
| 6,970,165 B2 | * | 11/2005 | Wollny et al. ............. | 345/423 |
| 2002/0072884 A1 | | 6/2002 | El-Ratal | |
| 2002/0144231 A1 | | 10/2002 | Hariya et al. | |

FOREIGN PATENT DOCUMENTS

| | | |
|---|---|---|
| JP | 2002-245098 | 8/2002 |
| KR | 1020000031964 | 6/2000 |
| KR | 1020010039245 | 5/2001 |
| WO | WO 01/29712 | 4/2001 |

OTHER PUBLICATIONS

Article "Parallel, Three-Dimensional Finite Element Mesh Generation Based on Octree Data Structures" by A. J. Barragan and J. S. Reeve, pp. 1-9, Sep. 11, 2000.*

Article "An Automatic Three-Dimensional Finite Element Mesh Generation System for the Poisson-Boltzmann Equation" by C. H. Cortis and R. A. Friesner, pp. 1570-1590, Mar. 12, 1997.*

* cited by examiner

Primary Examiner — Tize Ma
(74) Attorney, Agent, or Firm — The Farrell Law Firm, P.C.

(57) ABSTRACT

A method and apparatus for generating a three-dimensional FEM are provided. In the three-dimensional FEM generating method, a surface mesh is generated by meshing the surface of a three-dimensional model of a three-dimensional object. A projected contour is generated by projecting the three-dimensional model from one direction, and a projected contour mesh is generated by meshing the surface of the projected contour. A solid base mesh is generated by stacking solid elements on a base side formed of two-dimensional elements of the projected contour mesh. The surface mesh is substituted into the solid base mesh in alignment with the projected contour. A final solid mesh is generated by distinguishing solid elements surrounded by the surface mesh in the solid base mesh.

10 Claims, 10 Drawing Sheets

METHOD AND APPARATUS FOR GENERATING THREE-DIMENSIONAL FINITE ELEMENT MESH

PRIORITY

This application claims priority under 35 U.S.C. §119 to an application entitled "Method and Apparatus for Generating Three-Dimensional Finite Element Mesh" filed in the Korean Intellectual Property Office on Nov. 17, 2003 and assigned Serial No. 2003-81037, the contents of which are incorporated herein by reference.

BACKGROUND OF THE INVENTION

1. Field of the Invention

The present invention relates generally to a method of generating a finite element mesh (FEM) for finite element analysis (FEA), and in particular, to a method and apparatus for generating a three-dimensional FEM.

2. Description of the Related Art

A finite element method is one of the techniques for numerical analysis of approximation of differential equations. The finite element method is generally used in fields which deal mainly with the structural dynamic analysis of objects, such as mechanical engineering. The finite element method finds wide use in applications for analysis of the strength and transformation of structures, fluid flow analysis, and electromagnetic field analysis. Particularly, it is preferable to analyze the structures of parts in a design process in order to save design cost and marketing time in manufacture of various electric, electronic products and their component parts.

To meet design engineers' demands, CAD (Computer Aided Drafting) is used as a basic FEA tool. In addition, Pro-Engineer, CATIA, and IDEAS are utilized as three-dimensional modeling tools.

The finite element method decomposes a problem domain to be analyzed regarding a structure, machine or part of interest into elements of a predetermined volume as a pre-process of FEA. This is called meshing. Particularly, for structural analysis of a three-dimensional model, an FEM is generated by partitioning the area that the three-dimensional model occupies into a plurality of fine elements called solid elements.

A solid element is a simple geometrical form, for example, in a tetrahedral or hexahedral shape. Solid elements may be divided into a tetrahedral element, a hexahedral element, a prism element, and a pyramid element according to their configurations. Despite its ability of freely representing any three-dimensional shape, the tetrahedral solid element is of low quality in analysis accuracy and requires complex computation because too many solid elements are produced. Thus, a hexahedral mesh is usually generated using hexahedral solid elements (or prism solid elements) tto increase analysis accuracy or computation efficiency.

FIGS. 1A to 1E illustrate sequential FEM models generated in a conventional FEM generating method. A cup is FEM-modeled three-dimensionally, by way of example. An initial cup-shaped model can be a CAD model. Traditionally, to generate a three-dimensional FEM of the cup geometry, an operator generates a solid mesh for the bottom of the cup by solid meshing, as illustrated in FIG. 1A. Referring to FIGS. 1B and 1C, the wall of the cup is solid-meshed by stacking elements of an appropriate shape on the bottom solid mesh. Referring to FIGS. 1D and 1E, a solid mesh is generated for the handle of the cup by applying elements of an appropriate shape to the wall solid mesh. Thus, a final cup solid mesh is completed.

As described above, the operator generates solid elements by manually defining nodes that form each solid element one by one and generates a final three-dimensional solid mesh in the conventional FEM generating method. This is a very complex task. Therefore, a long time is required and an experienced operator is needed to generate good-quality elements. For a car engine, for example, a modeling time taken to generate a hexahedral FEM from a CAD model can take anywhere from 3 to 6 months. In the case of a general electronic appliance, a model time between one day and thirty days is typically required.

To reduce the time required for generation of a three-dimensional FEM, various techniques have been developed to automate the FEM generation with the aid of a computer. Examples of the techniques are U.S. Pat. No. 5,768,156 entitled "Connectivity-Based, All Hexahedral Mesh Generation Method and Apparatus", and U.S. Pat. No. 6,578,189 entitled "Hexahedral Mesh Generation Method and Device". The above FEM generation methods have limitations in generating a good-quality FEM because they require a large volume of computation and many elements of relatively small sizes.

SUMMARY OF THE INVENTION

An object of the present invention is to provide a method and apparatus for generating a three-dimensional FEM within a reduced time.

Another object of the present invention is to provide a method and apparatus for generating a three-dimensional FEM having good-quality elements to facilitate an effective FEA.

The above objects are achieved by providing a method and apparatus for generating a three-dimensional FEM.

According to one aspect of the present invention, in a three-dimensional FEM generating method, a surface mesh is generated by meshing the surface of a three-dimensional model of a three-dimensional object. A projected contour is generated by projecting the three-dimensional model from one direction, and a projected contour mesh is generated by meshing the surface of the projected contour. A solid base mesh is generated by stacking solid elements on a base side formed of two-dimensional elements of the projected contour mesh. The surface mesh is substituted into the solid base mesh in alignment with the projected contour. A final solid mesh is generated by distinguishing solid elements surrounded by the surface mesh in the solid base mesh.

According to another aspect of the present invention, in a three-dimensional FEM generating apparatus, a computer has a CPU (Central Processing Unit), a ROM (Read Only Memory), a RAM (Random Access Memory), and an FEM processor, for computing according to an FEM generation program executed in the FEM processor, and a storage connected to the computer, for storing in an FEM data storing area temporary models and a final solid mesh resulting from an FEM generation operation. In the FEM processor, a surface mesher generates a surface mesh of a three-dimensional model using three-dimensional model information stored in the FEM data storing area, a bottom shape generator generates a bottom shape being a projected contour of the three-dimensional model using the three-dimensional model information or the surface mesh, a bottom mesher generates a bottom mesh by meshing the bottom shape, a solid base mesher generates a solid base mesh by stacking solid elements on a base side formed of two-dimensional elements of the bottom mesh, and a final solid mesher generates a final solid mesh by substituting the surface mesh into the solid base mesh and distinguishing solid elements surrounded by the surface mesh in the solid base mesh.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

FIGS. 2A to 2G illustrate sequential FEM models generated in a three-dimensional FEM generating method according to an embodiment of the present invention and FIGS. 3A to 3E are enlarged views of the FEM models illustrated in FIGS. 2B, 2D, 2E, 2F and 2G, respectfully.

Referring to FIGS. 2A to 3E, a three-dimensional model (e.g. CAD model) of a cup is first prepared in the process of three-dimensional FEM generation according to the embodiment of the present invention. This CAD model may be generated using a CAD tool and saved as a file in advance by an operator. A surface mesh is created from the CAD model by surface meshing, as illustrated in FIG. 2B and FIG. 3A. The surface meshing can be performed in a manner as disclosed in U.S. Pat. No. 5,315,537 entitled "Automated Quadrilateral Surface Discretization and Apparatus Usuable to Generate Mesh in a Finite Element Analysis System" or according to any other surface meshing method.

Figure 1:
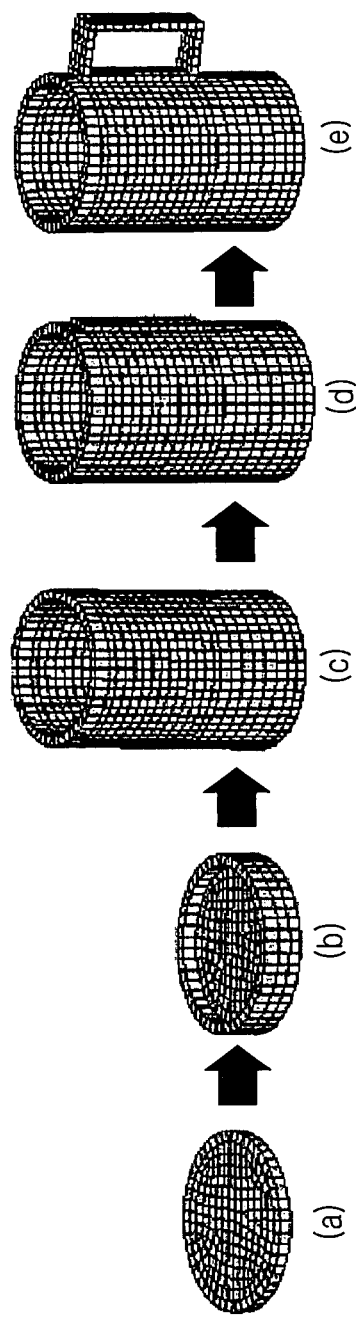
FIGS. 1A to 1E illustrate sequential FEM models generated in a conventional three-dimensional FEM generating method[PLEASE LABEL FIG. 1 "PRIOR ART."]
Figure 2:
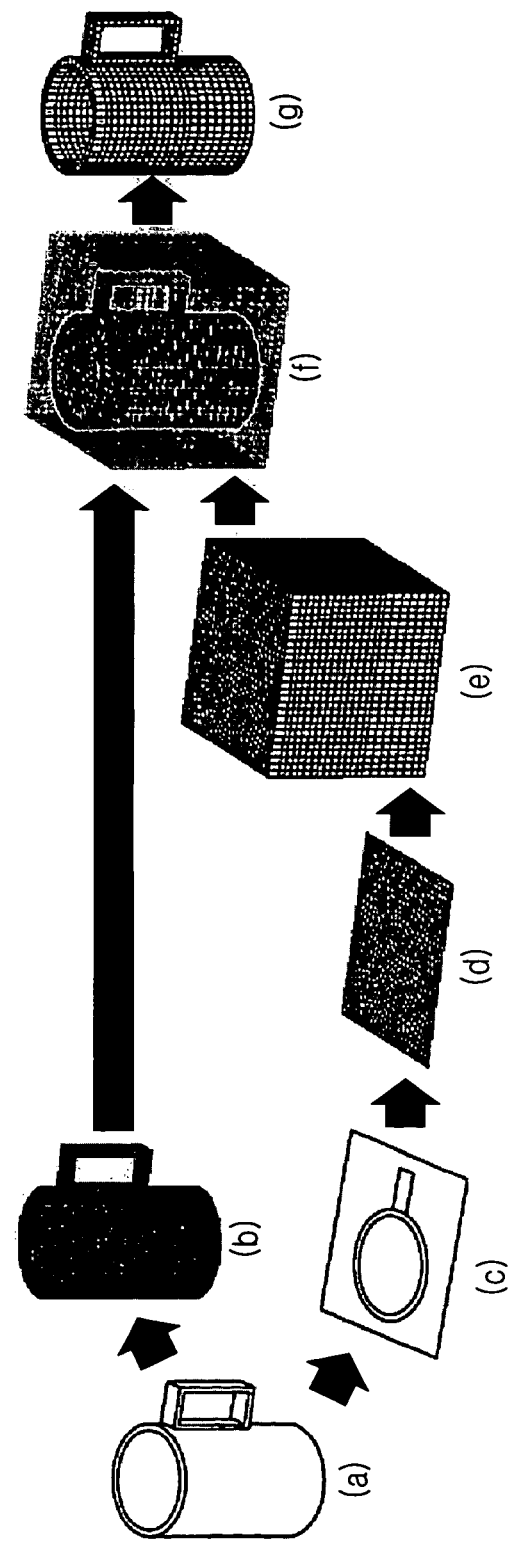
FIGS. 2A to 2G illustrate sequential FEM models generated in a three-dimensional FEM generating method according to an embodiment of the present invention.
Figure 3A:
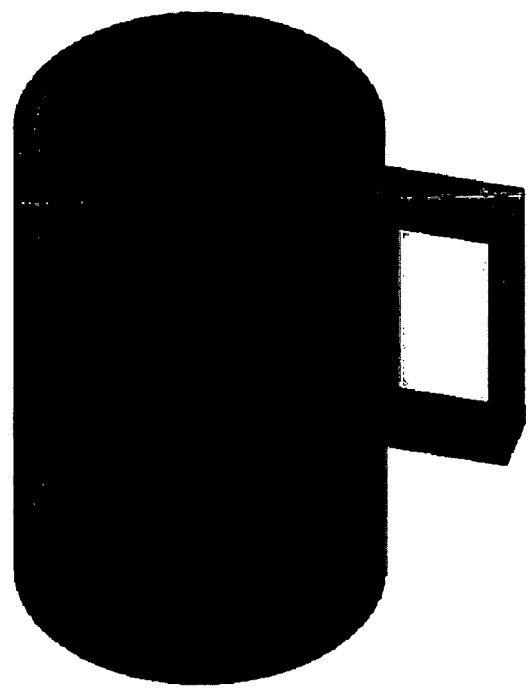
FIGS. 3A to 3E are enlarged views of the FEM models illustrated in FIGS. 2B, 2D, 2E, 2F and 2G, respectfully.
Figure 3B:
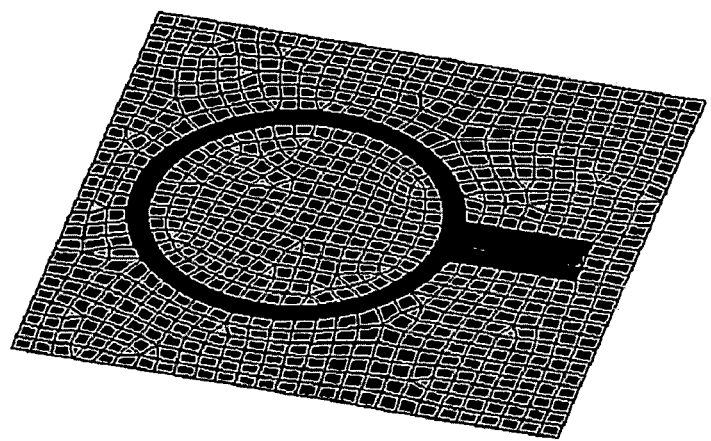

A projected contour (cup bottom) of the CAD model of the cup illustrated in FIG. 2A is created as illustrated in FIG. 2C. Assuming that the CAD model is at (x, y, z) coordinates and the z axis is defined as a vertical direction, the projected contour is created on an x-y plane. The cup bottom shape can be derived from the surface mesh illustrated in FIG. 2B. As illustrated in FIG. 2D and FIG. 3B, a bottom mesh is created by surface-meshing the projected contour in an appropriate method.

Figure 3C:
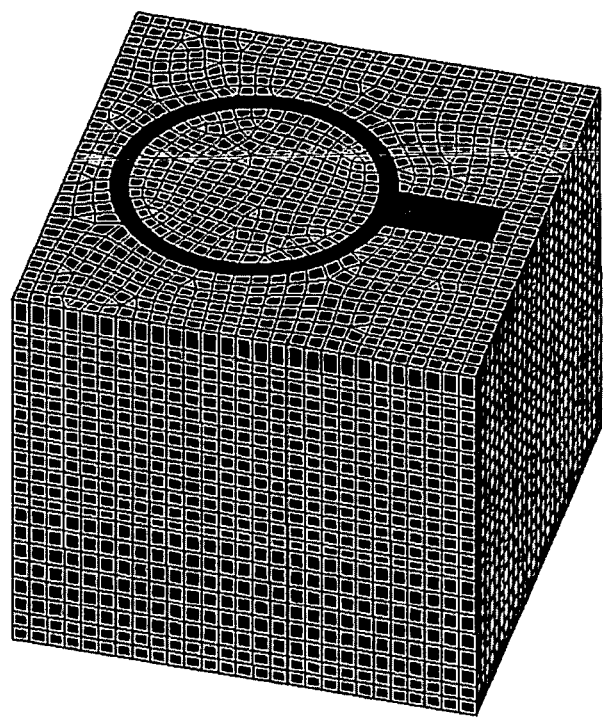

Referring to FIG. 2E and FIG. 3C, a solid base mesh is generated based on the bottom mesh. Specifically, solid elements of an appropriate height are stacked on a base side consisting of the two-dimensional elements of the bottom mesh. The height of each solid element can be automatically set approximate to the width/length of each two-dimensional element in the bottom mesh, or preset to an arbitrary value by the operator. The solid elements are stacked to the height of the CAD model.

Figure 3D:
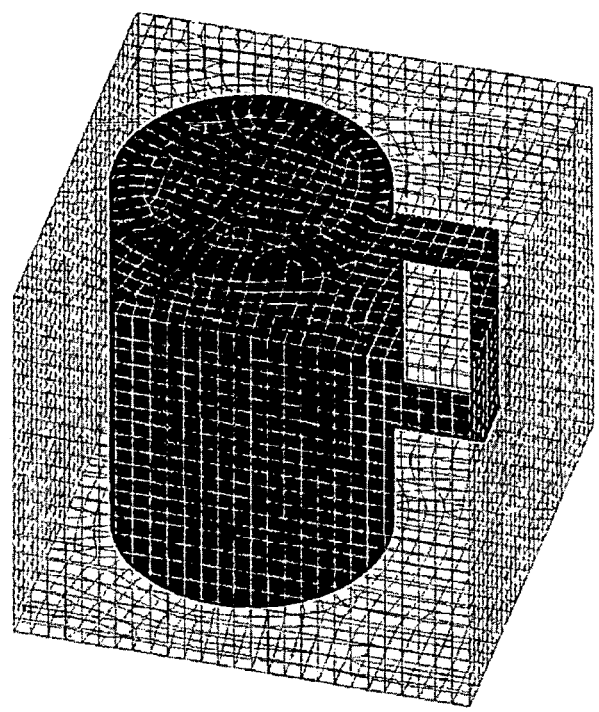
Figure 3E:
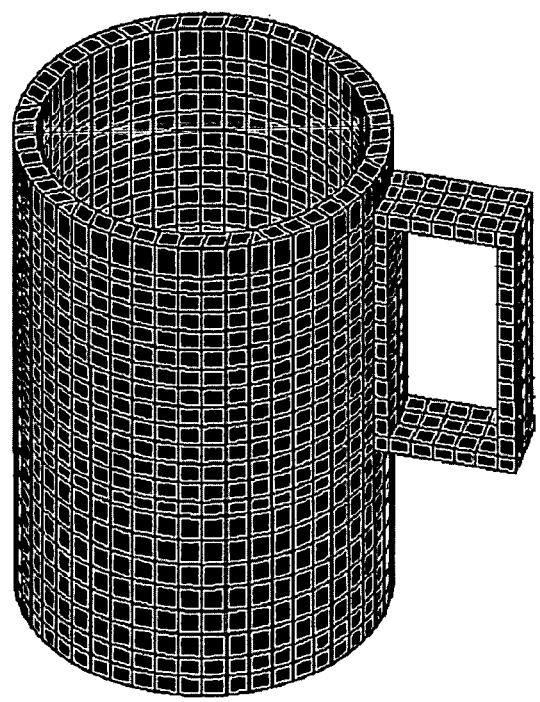

Referring to FIG. 2F and FIG. 3D, the surface mesh illustrated in FIG. 2B is substituted into the solid base mesh illustrated in FIG. 2E by aligning the surface mesh to the projected bottom contour of the solid base mesh. Referring to FIG. 3E, solid elements other than those surrounded by the surface mesh in the solid base mesh, that is, other than solid elements inside a three-dimensional shape are removed, thereby producing a final solid mesh. Each of the interior solid elements surrounded by the surface mesh in the solid base mesh is identified by counting how many times a line connecting the solid element (a reference point appropriately set in the solid element) to a reference point outside the solid base mesh crosses the surface mesh. If the count is an odd number, it is determined that the solid element is inside the surface mesh. If the count is an even number, it is determined that the solid element is outside the surface mesh.

The three-dimensional FEM generating method according to the present invention first meshes the surface of a whole three-dimensional shape, creates a solid base mesh surrounding the three-dimensional shape, and then calculates a solid shape surrounded by the surface mesh in the solid base mesh, as described above in connection with FIGS. 2A to 2G. As noted from FIGS. 2C, 2D and 2E, the solid base mesh involves the contour (bottom) of the three-dimensional shape (cup) projected from one direction. The generation of the surface mesh and the solid base mesh and the generation of the final solid mesh using the surface mesh and the solid base mesh are relatively simple. Therefore, the time required to generate the final solid mesh is shortened greatly as compared to the conventional solid mesh generation. Furthermore, the solid mesh is created with good-quality solid elements.

As illustrated in FIGS. 2C and 2D, in the case where a three-dimensional shape is projected and a surface mesh is created for the projected contour by surface meshing, there is no need for meshing the surfaces of the remaining part of the shape, that is, other than the bottom. Yet, an appropriate area (square) covering the projected contour is surface-meshed and the solid base mesh is generated based on the surface mesh in FIGS. 2A to 2G.

Figure 4:
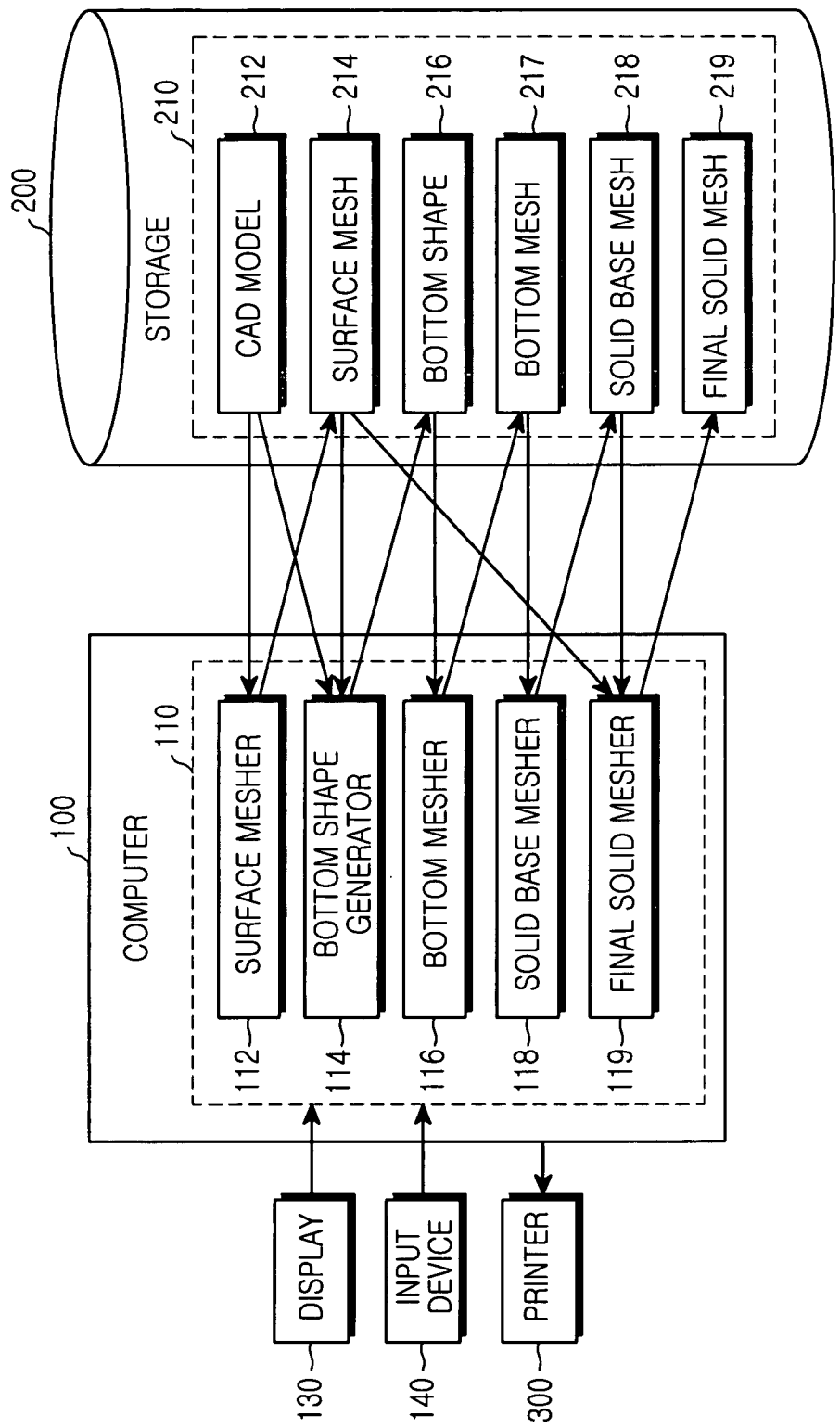
FIG. 4 is a schematic block diagram of a computer system for generating a three-dimensional FEM according to the the present invention.

FIG. 4 is a schematic block diagram of a computer system for generating a three-dimensional FEM according to the present invention. Referring to FIG. 4, the computer system for implementing the present invention is similar in configuration to a typical computer system. The computer system comprises a computer 100, a storage 200, a display 130, an input device 140, and a printer 300 as an auxiliary device. The computer 100 has an FEM processor 110 in addition to a CPU (Central Processing Unit), a ROM (Read Only Memory), and a RAM (Random Access Memory) (each not shown), for computing according to an FEM generation program of the present invention executed in the FEM processor 110. The storage 200, having a hard disk drive (HDD), is connected to the computer 100 and stores in an FEM data storing area 210 temporary models and a final solid mesh generated during the FEM generation operation. The display 130 includes an LCD (Liquid Crystal Display) monitor and displays images and text associated with the operation of the computer 100. The input device 140 includes a keyboard and a mouse. It receives a key input from a user and provides the key input to the computer 100.

The computer 100 is provided with the FEM processor 110 for executing the FEM generation program according to the present invention. This FEM generation program is saved as a file in the storage 200 and read to a working memory of the computer 100 when an FEM is generated.

In operation, the FEM processor 110 includes a surface mesher 112 for performing surface meshing on CAD model data as illustrated in FIG. 2A stored in a three-dimensional CAD model block 212 of the FEM data storing area 210. Surface mesh data as illustrated in FIG. 2B produced by the surface mesher 112 is stored in a surface mesh block 214 of the FEM data storing area 210. A bottom shape generator 114 generates a bottom shape being the projected contour of the CAD model as illustrated in FIG. 2C based on the CAD model data stored in the CAD model block 212 or data stored in the surface mesh block 214. The bottom shape data is stored in a bottom shape block 216 of the FEM data storing area 210. A bottom mesher 116 meshes the bottom shape, thus producing a bottom mesh as illustrated in FIG. 2D. The bottom mesh is stored in a bottom mesh block 217 of the FEM data storing area 210. A solid base mesher 118 generates a solid base mesh as illustrated in FIG. 2E using the data stored in the bottom mesh block 217. The solid base mesh data is stored in a solid base mesh block 218 of the FEM data storing area 210. A final solid mesher 119 generates a final solid mesh as illustrated in FIG. 2G using the surface mesh data stored in the surface mesh block 214 and the solid base mesh data stored in the solid base mesh block 218. The final solid mesh is stored in a final solid mesh block 219 of the FEM data storing area 210.

Figure 5:
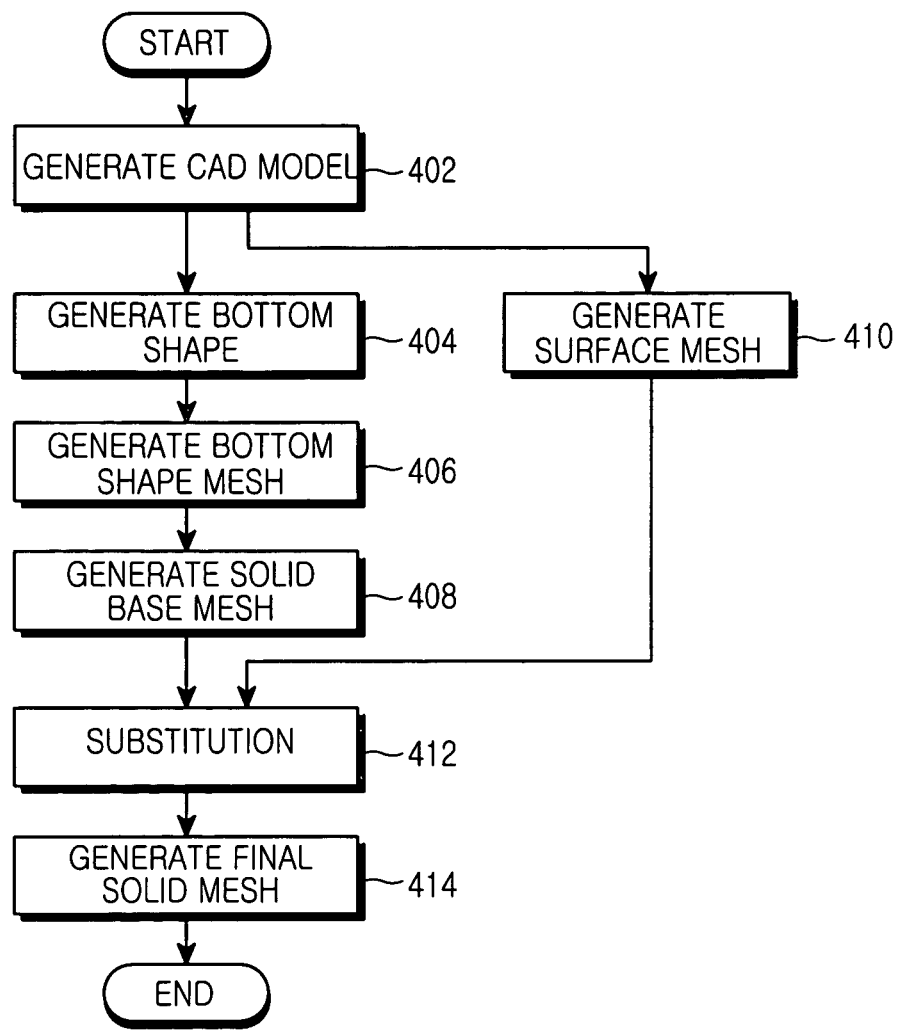
FIG. 5 is a flowchart illustrating a three-dimensional FEM generating operation in the computer system illustrated in FIG. 4 according to the present invention.

FIG. 5 is a flowchart illustrating a three-dimensional FEM generating operation according to the present invention. Referring to FIG. 5, the computer system that implements the present invention generates a CAD model using a separately procured CAD tool by operator manipulation in step 402. After step 402, steps 404 and 410 are performed. The computer system generates a bottom contour from the CAD model in step 404 and meshes the bottom contour in step 406. In step 408, the computer system creates a solid base mesh based on the bottom mesh. Then, the procedure goes to step 412.

In step 410, the computer system meshes the surface of the CAD model. After step 408 and step 410, the surface mesh is substituted into the solid base mesh in step 412 and the remaining solid elements other than inner solid elements surrounded by the surface mesh in the solid base mesh are eliminated, thereby generating and producing a final solid mesh in step 414.

Figure 6:
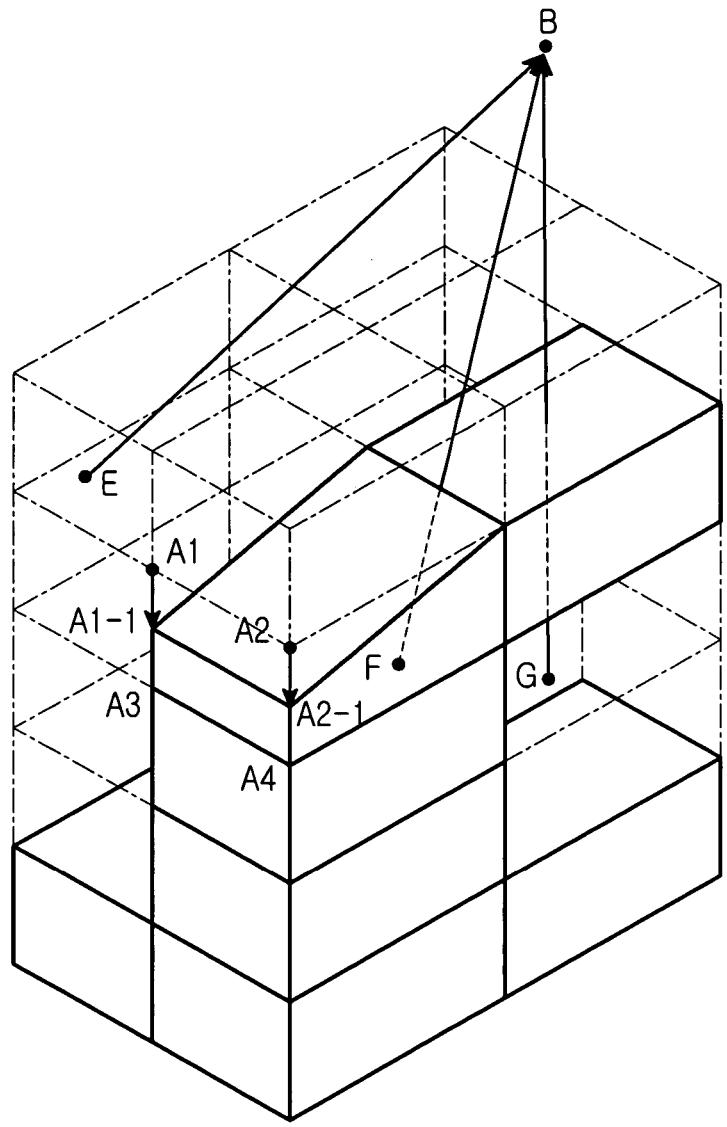
FIG. 6 illustrates a method of setting each element in the process of three-dimensional FEM generation according the present invention.

FIG. 6 illustrates a method of setting each element in the process of three-dimensional FEM generation according to the present invention. Each solid element marked with a solid line is set by substituting the surface mesh into the solid base mesh marked with a one-dotted dashed line. After the surface dash is disposed in alignment with the projected contour of the solid base mesh, the solid elements inside the surface mesh in the solid base mesh are distinguished, to thereby create the final solid mesh. Referring to FIG. 6, a solid element inside the surface mesh in the solid base mesh is identified by checking how many times a line is drawn across the surface mesh to connect the solid element (a reference point in the solid element) to a random reference point outside the solid base mesh (or an appropriate reference point inside the solid base mesh). In the case illustrated in FIG. 6, solid element reference points E, F and G are given. The solid element reference points E and G are outside the surface mesh. Lines come across the surface mesh 0 and 2 times, respectively, between F and an outer reference point B and between G and B. These numbers are even (including 0). Thus the corresponding solid base elements are considered outside the surface mesh. The line between F and B is drawn across the surface mesh once. Because 1 is odd, the corresponding solid base element is considered inside the surface mesh.

The final solid mesh is created by distinguishing inner solid elements from outer solid elements with respect to the surface mesh. Amongst the solid elements, solid elements at boundaries can be controlled more accurately. Referring to FIG. 6, some node points A1 and A2 in a solid element including the reference point F (hereinafter, referred to as a solid element F) may not match to node points A1-1 and A2-1 corresponding to them in the initial surface mesh. That is, the gap between the node points A1 & A2 and A1-1 & A2-1 may be greater than a predetermined threshold. In this case, the positions of A1 and A2 are changed by moving A1 and A2 to A1-1 and A2-1. Although node points A3 and A4 can be moved to A1-1 and A2-1, it is preferable to move nearer node points to A1-1 and A2-1.

The method of generating a three-dimensional FEM and the structure and operation of the apparatus for generating a three-dimensional FEM according to the present invention can be implemented as described above.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of generating a three-dimensional finite element mesh (FEM), comprising the steps of:
    generating a surface mesh by meshing the surface of a three-dimensional model of a three-dimensional object;
    generating a projected contour by projecting the three-dimensional model from one direction;
    generating a projected contour mesh by meshing the surface of the projected contour;
    generating a solid base mesh by repeatedly stacking solid elements on a base side formed of two-dimensional elements of the projected contour mesh;
    substituting the surface mesh into the solid base mesh in alignment with the projected contour by inserting the surface mesh into a three-dimensional structure formed by the solid base mesh; and
    generating a final solid mesh by distinguishing solid elements surrounded by the surface mesh in the solid base mesh and eliminating all solid elements from the solid base mesh that are not surrounded by the surface mesh.

2. The method of claim 1, wherein the three-dimensional model is a CAD (Computer Aided Drafting) model and saved as a CAD file.

3. The method of claim 1, wherein the step of generating a projected contour comprises the step of generating the projected contour using one of the three-dimensional model or the surface mesh.

4. The method of claim 1, wherein the height of each solid element in the solid base mesh is set according to the size of each two-dimensional element in the bottom mesh.

5. The method of claim 1, wherein the step of generating a solid base mesh comprises the step of repeatedly stacking the solid elements to a height corresponding to the size of the three-dimensional model.

6. The method of claim 5, further comprising the step of comparing each node point of each solid element in the final solid mesh with a node point in a surface mesh element corresponding to the solid node point and changing the node point according to the comparison.

7. An apparatus for generating a three-dimensional finite element mesh (FEM), comprising:
- a computer having a CPU (Central Processing Unit), a ROM (Read Only Memory), a RAM (Random Access Memory), and an FEM processor, for computing according to an FEM generation program executed in the FEM processor; and
- a storage connected to the computer, for storing in an FEM data storing area temporary models and a final solid mesh resulting from an FEM generation operation, wherein the FEM processor includes:
- a surface mesher for generating a surface mesh of a three-dimensional model using three-dimensional model information stored in the FEM data storing area;
- a bottom shape generator for generating a bottom shape being a projected contour of the three-dimensional model using one of the three-dimensional model information or the surface mesh;
- a bottom mesher for generating a bottom mesh by meshing the bottom shape;
- a solid base mesher for generating a solid base mesh by repeatedly stacking solid elements on a base side formed of two-dimensional elements of the bottom mesh; and
- a final solid mesher for generating a final solid mesh by substituting the surface mesh into the solid base mesh by inserting the surface mesh into a three-dimensional structure formed by the solid base mesh, distinguishing solid elements surrounded by the surface mesh in the solid base mesh, and eliminating all solid elements from the solid base mesh that are not surrounded by the surface mesh.

8. The apparatus of claim 7, wherein the three-dimensional model is a CAD (Computer Aided Drafting) model.

9. The apparatus of claim 7, wherein the height of each solid element in the solid base mesh set according to the size of each two-dimensional element in the bottom mesh.

10. The apparatus of claim 7, wherein the solid elements are repeatedly stacked to a height corresponding to the size of the three-dimensional model.

* * * * *